United States Patent
Ihara et al.

(10) Patent No.: US 6,366,773 B1
(45) Date of Patent: Apr. 2, 2002

(54) RADIO TERMINAL OPERATION DATA WRITE METHOD IN PRIVATE MOBILE COMMUNICATION SYSTEM

(75) Inventors: Takanobu Ihara; Eiji Katsuki, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/321,859

(22) Filed: May 28, 1999

(30) Foreign Application Priority Data

May 29, 1998 (JP) ........................... 10-164428

(51) Int. Cl.$^7$ ........................... H04M 3/00; H04Q 7/20; H04B 1/38
(52) U.S. Cl. ........................ 455/419; 455/554; 455/555; 455/456; 455/435; 455/432
(58) Field of Search .................... 455/419, 555, 455/554, 456, 435, 432, 418, 420; 379/225, 231, 232, 234

(56) References Cited

U.S. PATENT DOCUMENTS 5,210,787 A * 5/1993 Hayes et al. ................. 455/435
5,680,440 A * 10/1997 Ghisler et al. ............... 455/432
6,285,879 B1 * 9/2001 Lechner et al. .............. 455/554

FOREIGN PATENT DOCUMENTS

| JP | 9-247741 | 9/1997 | ............ H04Q/7/34 |
| JP | 10-70765 | 3/1998 | ............ H04Q/7/38 |

* cited by examiner

*Primary Examiner*—Edward F. Urban
*Assistant Examiner*—Rafael Perez-Gutierrez
(74) *Attorney, Agent, or Firm*—Foley & Lardner

(57) ABSTRACT

In a radio terminal operation data write method in a private mobile communication system including a multi-node PBX having a plurality of node exchanges connected to each other through a high-speed data line, a node exchange to which a maintenance terminal is connected specifies a registration node exchange of a radio terminal from a logical extension number which is unique within the multi-node PBX and added to the radio terminal, acquires information on a current location area node exchange of the radio terminal through the high-speed data line, and requests the current location area node exchange to write terminal operation data on the radio terminal. The current location area node exchange acquires termination operation data on the radio terminal from the registration node exchange through the high-speed data line in accordance with the logical extension number and writes the terminal operation data.

7 Claims, 5 Drawing Sheets

RADIO TERMINAL OPERATION DATA WRITE METHOD IN PRIVATE MOBILE COMMUNICATION SYSTEM

BACKGROUND OF THE INVENTION

1. Field of the Invention

The present invention relates to a radio terminal operation data write method and, more particularly, to a radio terminal operation data write method in a private mobile communication system constituted by multi-node PBXs (Private Branch Exchanges) each having a plurality of node exchanges that communicate with each other through a high-speed data line.

2. Description of the Prior Art

To meet demands for wide-area, versatile intra-enterprise information exchange, an intra-enterprise exchange network which allows wide-area private branch telephone exchange by connecting a plurality of PBXs through trunk lines and a private mobile communication system called a business PHS (Personal Handyphone System) that accommodates radio terminals by connecting radio base stations to the respective PBXs have recently become widespread.

In such a private mobile communication system, a plurality of radio base stations are distributed on the premises of a company, and radio terminals present in the radio areas of these radio base stations are connected to PBXs through the radio base stations, thereby allowing extension speech communication within the same PBX, extension speech communication with other areas using an intra-enterprise exchange network through leased lines, and outside speech communication upon connection with a public network through a central office line.

In this conventional private mobile communication system, when a radio terminal belonging to a PBX in a certain area is to be used in a radio area managed by a PBX in another area, roaming processing must be performed. This is because SYS (System)-IDs as system call codes assigned to the respective PBXs to ensure matching between radio terminals and systems for providing mobile communication services to the radio terminals differ from each other. According to such specifications, communication is inhibited between a radio terminal and a radio base station to which different SYS-IDs are assigned regardless of whether the same communication protocol is used. This indicates that in a mobile communication service in a public network, a radio base station and a radio terminal belonging to different communication companies cannot communicate with each other.

In a conventional PBX, since the PBX cannot control radio terminals other than those whose attribute information such as operation/management information is registered, SYS-IDs are assigned to these radio terminals to identify them to allow mobile communication only between a radio terminal and a radio base station having identical SYS-IDs. Even in a private branch exchange network within the same company, different SYS-IDs are assigned to PBXs constituting the network.

When the operation/management information written in a radio terminal, e.g., the extension number or the contents of an additional service, is changed, the changed data must be written in the radio terminal. In this case, therefore, the radio terminal must be present in the radio area of a radio base station connected to a PBX in which the radio terminal is registered. When data written in a radio terminal is to be changed during operation, a maintenance terminal connected to the corresponding PBX designates the radio terminal whose data is to be changed, and performs connection for the data change operation. When this connection for the data change operation is properly performed for the target radio terminal, the changed data set by the maintenance terminal is transferred to the radio terminal, and the data in the radio terminal is rewritten. If, therefore, the power to the radio terminal subjected to the data change operation is turned off, or the radio terminal is not present in the radio area supervised by a PBX to which the maintenance terminal is connected, this data change operation cannot be performed.

A technique of always performing proper roaming, including information between tenants in a case wherein one PBX accommodates a plurality of companies, in a private mobile communication system in which a plurality of PBXs constituting an intra-enterprise exchange network independently perform attribute registration for radio terminals is disclosed in Japanese Unexamined Patent Publication No. 9-247741. In addition, a technique of allowing a radio terminal that can be used both in a private branch exchange network and a public exchange network to terminate a call by using either of the telephone numbers assigned in the respective networks without considering the network in which the radio terminal is present is disclosed in Japanese Unexamined Patent Publication No. 10-70765.

In a conventional PBX, management/operation information required for exchange processing for extension numbers and the like is subjected to closed control within each PBX, and communication between PBXs is controlled by exchanging limited information through a trunk line connecting the respective PBXs. This also applies to the operation of radio terminals accommodated in a private mobile communication system formed by connecting radio base stations to such conventional PBXs. That is, since management/operation information required for exchange processing is subjected to closed control in each PBX, identical SYS-IDs cannot be assigned to different PBXs. For this reason, the use of a radio terminal is basically limited within the radio wave zone of a radio base station connected to a specific PBX in which the attribute information of the radio terminal is registered for management/operation.

Even if, therefore, a wide-area private mobile communication system is formed by using conventional PBXs, the operation of each radio terminal is greatly limited by the home PBX in which each radio terminal is registered. The user cannot therefore enjoy sufficient benefit from the portability of a radio terminal.

When attribute information registered in a radio terminal used at a remote place is to be changed at the home PBX (even if the radio terminal is present within the same intra-enterprise exchange network), this data cannot be changed unless the radio terminal is present within the radio area supervised by the PBX in which the attribute information on the radio terminal is registered. In such a case, according to the prior art, the radio terminal must be brought back to the radio area of the home PBX.

SUMMARY OF THE INVENTION

The present invention has been made to solve the above problem in the prior art, and has as its object to provide a radio terminal operation data write method in a private mobile communication system which allows writing terminal operation data written in the radio terminal by radio regardless of a radio area supervised by any PBX in an intra-enterprise exchange network constituted by a plurality of PBXs.

In order to achieve the above object, according to the first aspect of the present invention, there is provided a radio terminal operation data write method in a private mobile communication system including a multi-node PBX having a plurality of node exchanges connected to each other through a high-speed data line, comprising the steps of:

causing a node exchange to which a maintenance terminal is connected to specify a registration node exchange of a radio terminal from a logical extension number which is unique within the multi-node PBX and added to the radio terminal, acquire information on a current location area node exchange of the radio terminal through the high-speed data line, and request the current location area node exchange to write terminal operation data on the radio terminal; and causing the current location area node exchange to acquire termination operation data on the radio terminal from the registration node exchange through the high-speed data line in accordance with the logical extension number and write the terminal operation data.

According to the first aspect, each of the plurality of node exchanges comprises a network database module for holding data common in the multi-node PBX, the terminal operation data on the radio terminal having the logical extension number is held in the network database module, and data specifying the registration node exchange for managing current location area information on the radio terminal is written in the network database module.

According to the first aspect, a better effect can be obtained if the node exchange to which the maintenance terminal is connected is a node exchange having a right to update the network database module.

In order to achieve the above object, according to the second aspect of the present invention, there is provided a radio terminal operation data write method in a private mobile communication system including a multi-node PBX having a plurality of node exchanges connected to each other through a high-speed data line, comprising:

the step of causing a maintenance terminal connected to a first node exchange of the plurality of node exchanges to designate a logical extension number unique in the multi-node PBX and added to a radio terminal with respect to the first node exchange and request the radio terminal to write terminal operation data by radio;

the step of causing the first node exchange to refer to a self-network database module holding data common in the multi-node PBX in accordance with the logical extension number so as to specify a third node exchange of the plurality of node exchanges in which the radio terminal operation data is registered;

the current location area node specifying step of causing the first node exchange to refer to a current information memory of the radio terminal of the third node exchange directly when the third node exchange coincides with the first node exchange or through the high-speed data line when the third node exchange differs from the first node exchange, thereby specifying a second node exchange of the plurality of node exchanges which corresponds to an area where the radio terminal is currently present;

the step of causing the first node exchange to output, to the second node exchange, a request to write operation data in the radio terminal by radio with the logical extension number being added to the request when the second node exchange differs from the first node exchange;

the step of causing the second node exchange to specify the third node exchange by referring to the self-network database module in accordance with the logical extension number;

the step of reading out data to be written in the radio terminal from operation data on the radio terminal held by the third node exchange directly when the second node exchange coincides with the third node exchange or through the high-speed data line when the second node exchange differs from the third node exchange;

the data write step of connecting the second node exchange to the radio terminal by radio and writing the data to be written in the radio terminal;

the step of causing the second node exchange to notify the first node exchange of a normal/abnormal end of the write processing when the second node exchange differs from the first node exchange; and the step of causing the first node exchange to notify the maintenance terminal of the normal/abnormal end.

The first node exchange in the second aspect is a node exchange having a right to update the network database module.

According to the second aspect, the current location area node specifying step comprises causing the first node exchange to notify the maintenance terminal of a write failure and end processing when the current information memory indicates that the radio terminal is in a busy state.

According to the second aspect, the data write step comprises causing the second node exchange to notify the first node exchange of a write failure when the second node exchange cannot be connected to the radio terminal by radio, and causing the first node exchange to notify the maintenance terminal of the write failure and end processing.

As is obvious from the above aspects, according to the present invention, operation data can be written by radio at a maintenance terminal connected to a proper node exchange or a maintenance terminal connected to a node exchange for managing a network database regardless of the radio wave zone of a radio base station in which a radio terminal is connected to any node exchange in a multi-node PBX or the radio terminal registered in any node exchange. Therefore, to write operation data, any limitation need not be imposed on a radio terminal. In addition, any maintenance terminal need not be prepared for each node exchange.

The above and many other objects, features and advantages of the present invention will become manifest to those skilled in the art upon making reference to the following detailed description and accompanying drawings in which preferred embodiments incorporating the principles of the present invention are shown by way of illustrative examples.

DETAILED DESCRIPTION OF PREFERRED EMBODIMENT

A preferred embodiment of the present invention will be described below with reference to the accompanying drawings.

Figure 1:
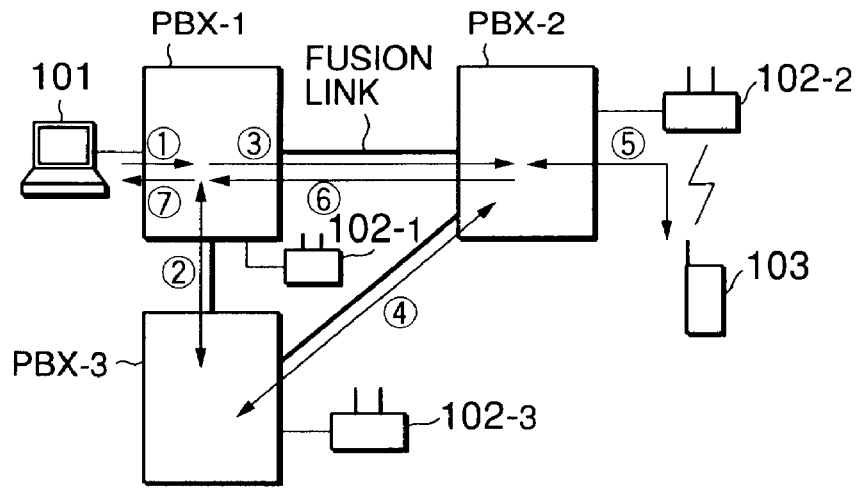
FIG. 1 is a block diagram showing the flow of data in a radio terminal operation data write method in a private mobile communication system according to an embodiment of the present invention.
Figure 2:
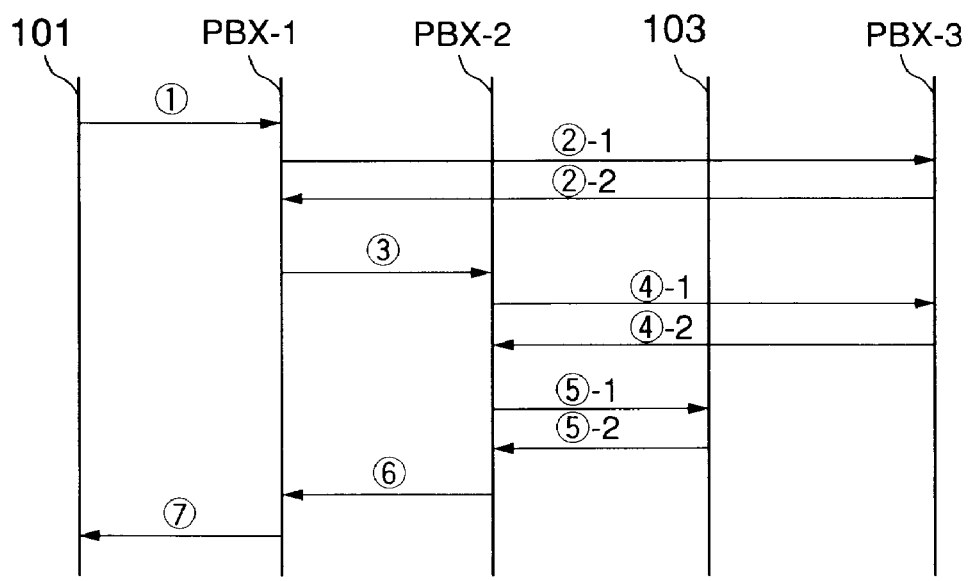
FIG. 2 is a sequence diagram sequentially showing the flow of data in FIG. 1.

FIG. 1 is a block diagram showing the flow of data in a radio terminal operation data write method in a private mobile communication system according to an embodiment of the present invention. FIG. 2 is a sequence diagram sequentially showing this flow of data. The same reference numerals in FIG. 2 denote the same elements as in FIG. 1.

The communication network shown in FIG. 1 will be described first.

The communication network in FIG. 1 is an intra-enterprise communication network in which a plurality of PBXs (multi-node PBXs) are arranged in a wide area. Radio base stations 102 are connected to the respective PBXs to provide private mobile communication services. A PBX-1, a PBX-2, and a PBX-3 respectively accommodating radio base stations are connected to each other through, for example, leased digital lines (fusion link) to constitute a fusion network on the basis of distributed node exchange network call control. These PBXs have mechanisms for freely referring to information in each PBX through the fusion link and controlling communication paths on the fusion link. In this case, the PBX-3 is a node exchange (home node) for a radio terminal 103.

The arrangement of the fusion network based on distributed node exchange network call control and the handling of management information will be described below with reference to FIGS. 3 to 6 by taking a multi-node PBX arrangement in a wire system as an example.

According to this multi-node PBX (fusion network based on distributed node exchange network call control), logical accommodation position information uniquely specified in the multi-node PBX is added to the physical accommodation position information on each resource whose operation is to be controlled as actual exchange processing, such as the switch accommodation positions of a plurality of node exchanges constituting the multi-node PBX, and call connection is managed in accordance with the logical accommodation position information. In addition, the respective node exchanges are connected to each other through LAN cables, high-speed digital lines, or the like to exchange data necessary for call control. With this arrangement, with regard to one call, the call control processing unit of one appropriate node exchange can collectively manage the associated modules of other node exchanges associated with the call.

Figure 3:
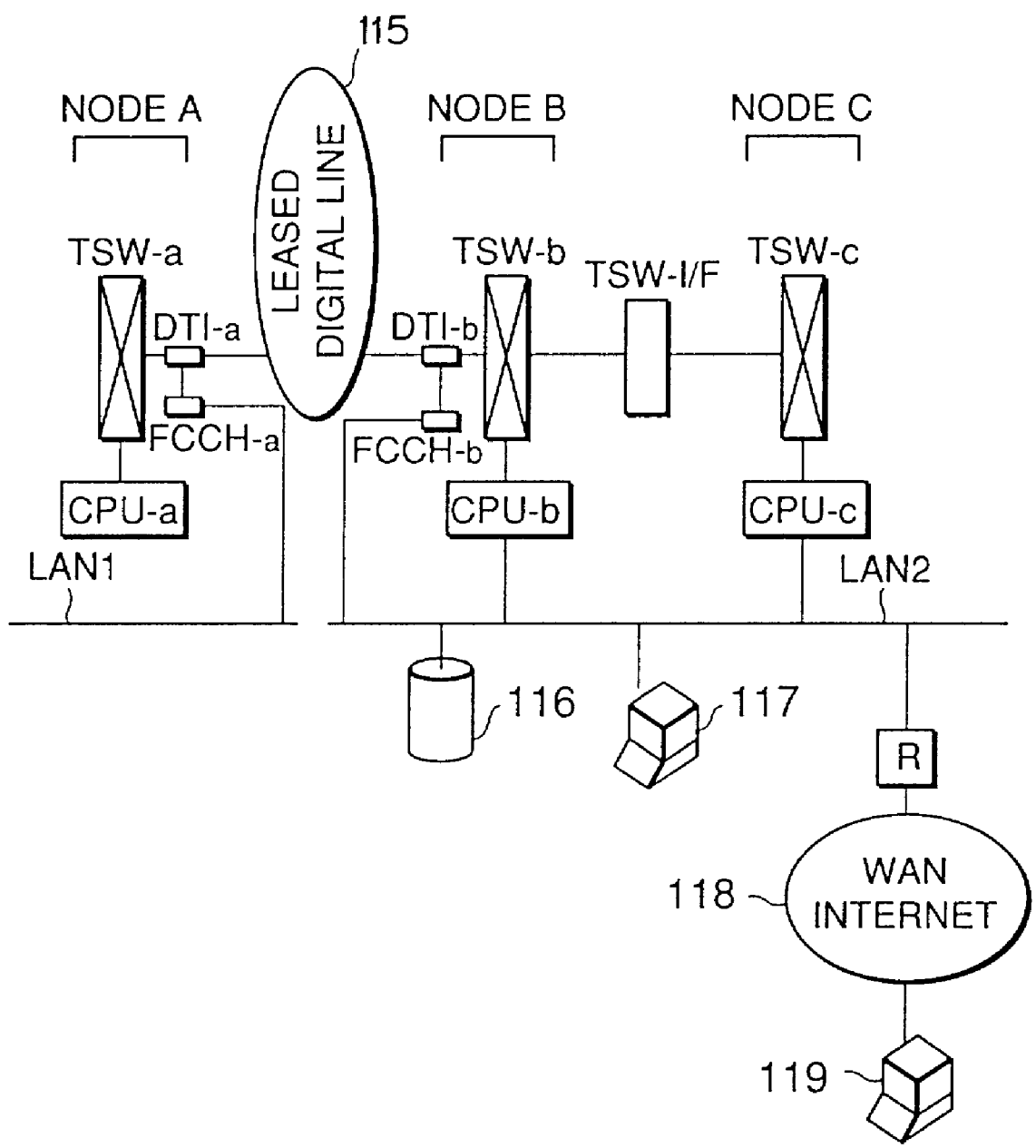
FIG. 3 is a block diagram showing an example of the arrangement of a fusion network based on distributed node exchange network call control.

FIG. 3 is a block diagram showing an example of the arrangement of the multi-node PBX, which is comprised of three node exchanges of nodes A, B, and C.

The nodes A, B, and C respectively have communication line switches TSW-a, TSW-b, and TSW-c and processors CPU-a, CPU-b, and CPU-c. The communication line switches TSW-b and TSW-c are connected to each other through a leased speech communication line switch interface TSW-I/F, and the communication line switches TSW-a and TSW-b are connected to each other through digital trunk interfaces DTI-a and DTI-b and a leased digital line 115.

The respective processors CPU-a, CPU-b, and CPU-c transmit/receive call control information for inter-node communication, system control information, maintenance operation information, and the like through local area networks LAN1 and LAN2. Necessary information between LAN1 and LAN2 is transmitted/received between the digital trunk interfaces DTI-a and DTI-b through fusion call control handle units FCCH-a and FCCH-b after being multiplexed on the leased digital line 115 together with the trunk line.

In the case shown in FIG. 3, a database (DB)/application server 116 is connected to LAN2 to provide various service functions in cooperation with the respective processors CPU-a, CPU-b, and CPU-c. In addition, terminals MATs 117 and 119 for maintenance operation monitoring are connected to the LAN2 directly or through a wide area network 118 such as the Internet connected through a router R.

Figure 4:
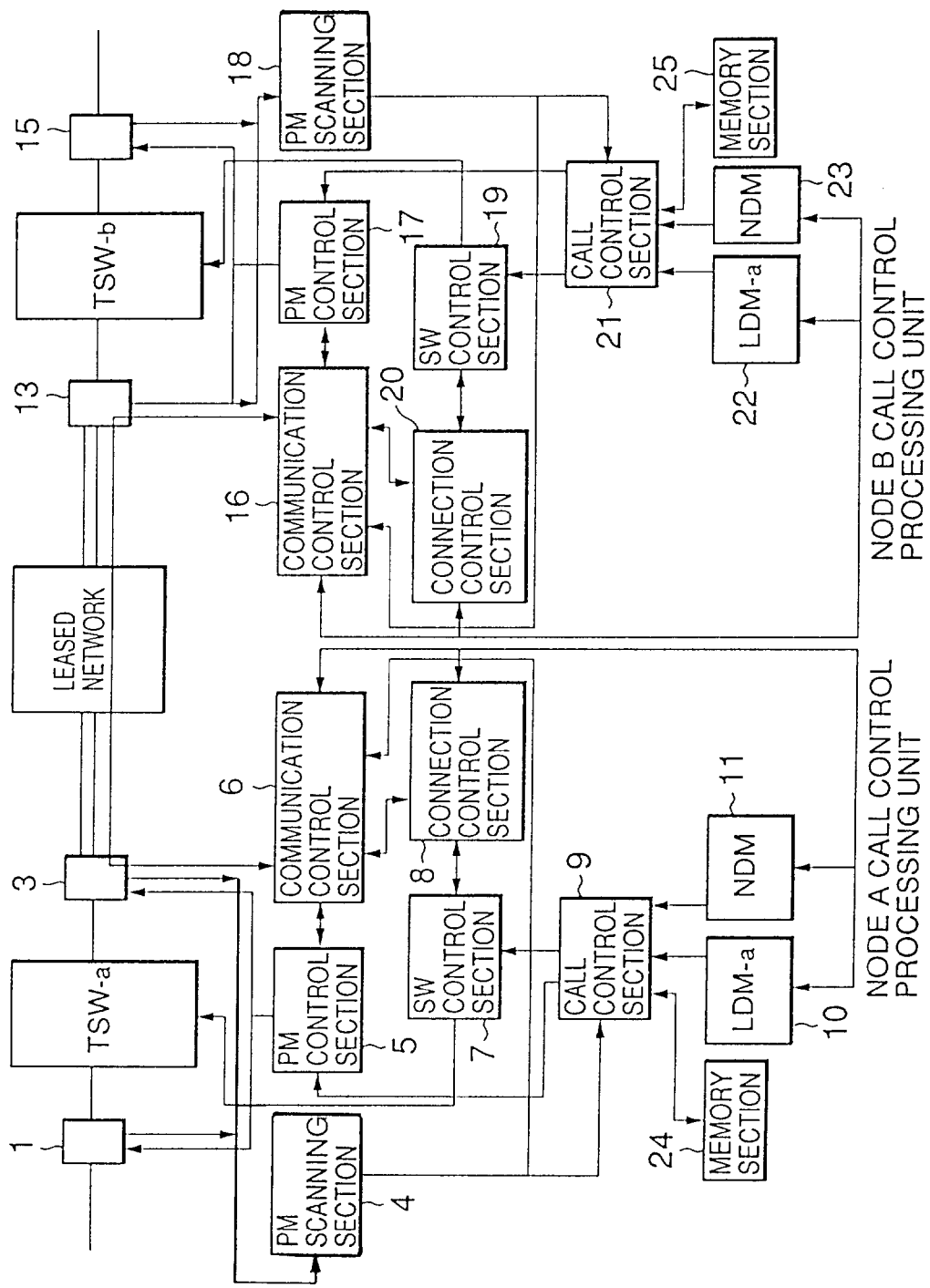
FIG. 4 is a block diagram showing the arrangement of each function associated with distributed node exchange network call control.

FIG. 4 is a block diagram showing the internal arrangement of a processor in FIG. 3 which is implemented by a speech communication line system including a speech communication line switch, call processing software, and the like in association with call control processing. FIG. 4 shows an example of the arrangement associated with the processors CPU-a and CPU-b of the nodes A and B.

The call control processing units of the nodes A and B respective include PM scanning sections 4 and 18 for monitoring input/output peripheral devices such as subscriber circuits 1 and 15 and trunk circuits 3 and 13 respectively connected to the communication line switches TSW-a and TSW-b, PM control sections 5 and 17 for controlling the input/output peripheral devices such as the subscriber circuits 1 and 15 and the trunk circuits 3 and 13, SW control sections 7 and 19 for controlling the communication line switches TSW-a and TSW-b, call control sections 9 and 21 for performing call control through the PM control sections 5 and 17 and the SW control sections 7 and 19, communication control sections 6 and 16 for controlling communications with other nodes, connection control sections 8 and 20 for managing connection between the nodes, local database modules LDM-a 10 and LDM-b 22 which hold information unique to the respective modes and allow the call control sections 9 and 21 to refer to the information, network database module NDMs 11 and 23 which hold information common to all the nodes and allow the call control sections 9 and 21 to refer to the information, and memory sections 24 and 25 used by the call control sections 9 and 21.

As described above, in the multi-node PBX, the resources associated with call control are managed in accordance with the physical accommodation position information on each node and the logical accommodation position information uniquely specified in the multi-node PBX. For this management, in addition to the arrangement shown in FIG. 4, the call control processing unit of each node is comprised of a conversion section 31 which is referred to by the PM scanning sections 4 and 18, the PM control sections 5 and 17, the SW control sections 7 and 19, the communication control sections 6 and 16, and the connection control sections 8 and 20.

Figure 5:
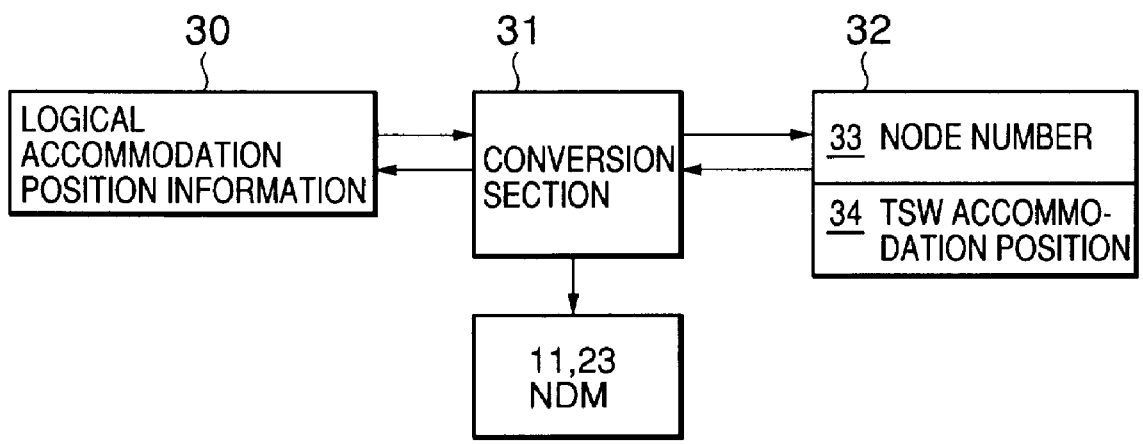
FIG. 5 is a block diagram showing the function of a conversion section for converting logical accommodation position information and physical accommodation position information in a distributed node exchange network.

FIG. 5 is a block diagram showing the function of the conversion section 31. The conversion section 31 performs conversion between logical accommodation position information 30 and physical accommodation position information 32 consisting of a node number 33 and a communication line switch accommodation position 34 by referring to the network database modules NDMs 11 and 23.

Figure 6:
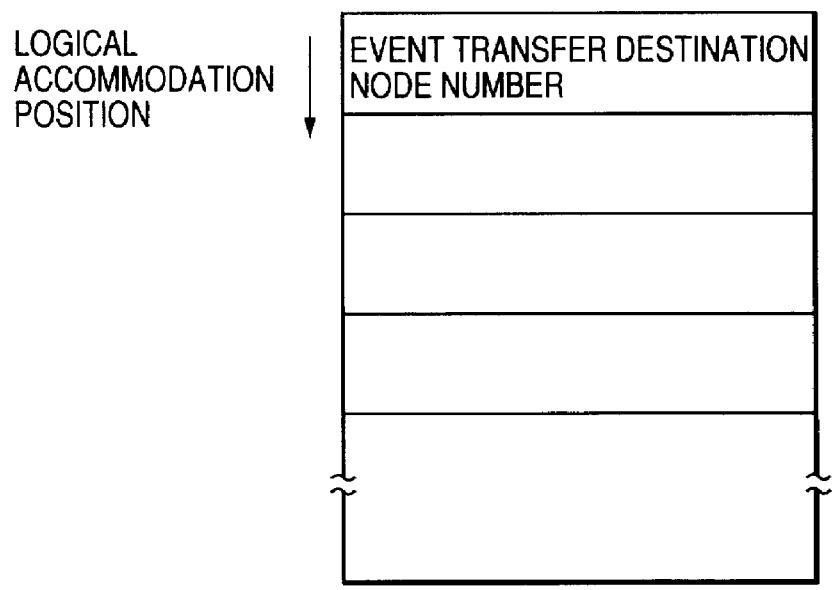
FIG. 6 is a view showing the arrangement of an event management memory associated with distributed node exchange network call control.

To prevent contention of control when call control is associated with a plurality of nodes under the control of the connection control sections 8 and 20, the call control processing units of the respective nodes have event transfer management memories, each having the arrangement shown in FIG. 6, which are managed by the connection control sections 8 and 20 and indicate the nodes of the call control sections 9 and 21 as the transfer destinations of events generated in the respective call control processes associated with the respective logical accommodation positions. These memories are referred to by the PM scanning sections 4 and 18, the PM control sections 5 and 17, the SW control sections 7 and 19, and the communication control sections 6 and 16. Note that in the initial state, the event transfer destination node numbers in the event transfer management memories indicate the node numbers at which the respective logical accommodation positions are accommodated.

The multi-node PBX has the above arrangement. When, for example, the PM scanning section 4 detects origination processing in the subscriber circuit 1 of the node A, the PM scanning section 4 causes the conversion section 31 to convert the physical accommodation position information of the subscriber circuit 1 into logical accommodation position information, and notifies the call control section 9 of the node A indicated by the event transfer management memory of the position information. The call control section 9 analyzes dial information by referring to the network database module NDM 11 to acquire, for example, termination logical accommodation position information and service information on a called extension.

On the basis of the service information, the call control section 9 outputs an origination PM control and termination PM control command to the PM control section 5 of the node A upon adding origination/termination logical accommodation position information to the commands without giving any consideration to the node numbers corresponding to the origination/termination logical accommodation positions (i.e., in the same manner as in the case of a single PBX), and also outputs a command for connection between the origination and termination logical accommodation positions to the SW control section 7.

The PM control section 5 causes the conversion section 31 to convert the logical accommodation position information into physical accommodation position information, and performs origination control on the subscriber circuit 1 of the node A. With regard to termination control, upon knowing that the physical accommodation position information indicates the node B, the PM control section 5 requests the communication control section 6 to transfer termination PM control information.

In the case shown in FIG. 3, the communication control section 6 of the node A transfers this termination PM control information to the communication control section 16 of the node B through LAN1, FCCH-a, DTI-a, the leased digital line 115, DTI-b, FCCH-b, and LAN2. The communication control section 16 of the node B distributes the information to the PM control section 17 of the node B.

In this manner, the PM control section 17 of the node B performs termination control on the called extension of the subscriber circuit 15 of the node B on the basis of the command from the call control section 9 of the node A.

Likewise, the SW control section 7 of the node A, which has received the command for connection between the origination and termination logical accommodation positions, causes the conversion section 31 to convert the logical accommodation position information into physical accommodation position information. If both the origination and termination physical accommodation positions indicate the node A, the SW control section 7 controls the communication line switch TSW-a to perform connection between the corresponding speech communication line and the switch.

If either the origination physical accommodation position or the termination physical accommodation position indicates another node, e.g., the node B, the SW control section 7 transfers a connection command to the connection control section 8.

The connection control section 8 causes the conversion section 31 to convert the logical accommodation position information into physical accommodation position information. If the command is for connection between the nodes A and B, the connection control section 8 selects an available trunk circuit between the nodes A and B and notifies the SW control section 7 of the logical accommodation position, and requests the communication control section 6 to transfer the control information to the connection control section 20 upon adding the connection number obtained from the local database module LDM-a to the origination/termination logical accommodation position information.

The communication control section 6 of the node A communicates with the communication control section 16 of the node B in the same manner as described above to transfer this control information to the connection control section 20 of the node B.

The connection control section 20 of the node B causes the conversion section 31 to convert the logical accommodation position information into physical accommodation position information. Upon recognizing that the connection command is addressed to the node B, the connection control section 20 specifies the corresponding trunk in accordance with the connection number, and outputs a command for connection with the termination accommodation position to the SW control section 19.

In response to the commands from the connection control sections 8 and 20, the SW control sections 7 and 19 of the nodes A and B respectively control the communication line switches TSW-a and TSW-b to establish call connection from the subscriber circuit 1 to the subscriber circuit 15 through the communication line switch TSW-a, the trunk circuit 3, the trunk circuit 13, and the communication line switch TSW-b.

In addition, the connection control section 8 selects a trunk circuit and sends the control information to the connection control section 20 of the node B to start connection control. In addition, the connection control section 8 updates the event transfer destination node corresponding to the logical accommodation position of the outgoing call in the event transfer management memory in FIG. 6 to the node B.

With this operation, for example, when the PM scanning section 4 of the node A detects a call loss caused by the caller of the subscriber circuit 1 during a call to the callee accommodated in the subscriber circuit 15 of the node B, the PM scanning section 4, which refers to the event transfer management memory, notifies the call control section 21 of the node B of this event through the communication control sections 6 and 16. The call control section 21 then designates necessary processing (adding logical accommodation position information without considering any physical node as in the case of the call connection processing described above).

In this manner, the associated control sections of the associated nodes execute necessary processing in accordance with commands from the call control sections of the corresponding nodes without any contention.

According to the fusion network based on distributed node exchange network call control, therefore, as in the operation described above, the call control sections of the corresponding nodes output various call control commands upon adding the logical accommodation position information on each resource without considering any physical node to which each resource belongs as in the case of a single PBX, thereby collectively and systematically controlling the associated resources of the associated nodes.

In the fusion network based on distributed node exchange network call control, therefore, a user can use a connected extension terminal without considering the specific node exchange in which the terminal is accommodated. In addition, any extension terminal connected to any node exchange can receive various additional services like an extension terminal connected to a single node PBX in the prior art.

With the use of such real-time data exchange between node exchanges, even in a private mobile communication system constructed in a wide area, a general radio terminal can be freely used as an extension terminal without any dependency on the roaming described above regardless of the radio wave zone of a radio base station connected to any node exchange in the multi-node PBX.

Figure 8:
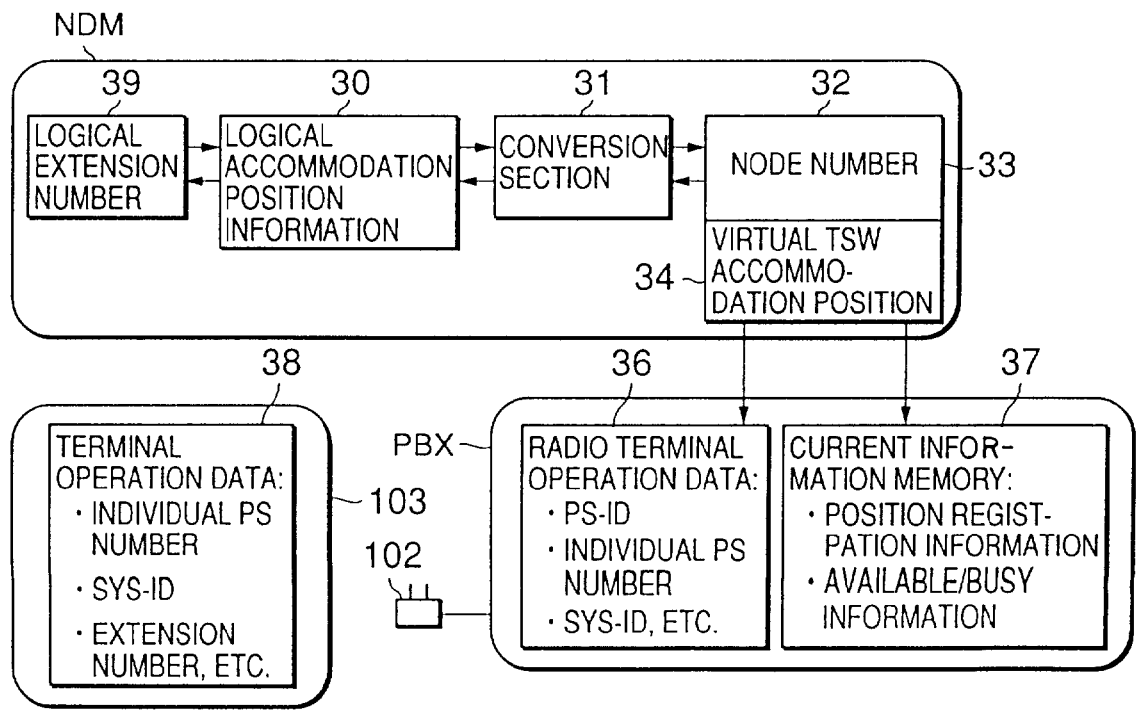
FIG. 8 is a block diagram showing the relationship between elements constituting the private mobile communication system in the distributed node exchange network.

FIG. 8 is a view for explaining how data are set when a private mobile communication system is constructed by connecting a radio base station to such a multi-node PBX.

As shown in FIG. 8, a common SYS-ID (system call code) is set in the radio base station 102 in the multi-node PBX, and a specific logical extension number 39 and an individual PS (personal station) number 3 are added to each radio terminal in the multi-node PBX corresponding to the logical accommodation position information 30 and written as terminal operation data 38 in the radio terminal 103, together with SYS-ID, the extension number, and the like.

For each radio terminal 103, radio terminal operation data 36 such as an extension number, an individual PS number, and additional service function information is registered in the local database module LDM of a corresponding node exchange PBX (the home node of the corresponding radio terminal). In addition, a current information memory 37 of each registered radio terminal is prepared in the memory section (memory sections 24 and 25 in FIG. 4) of each home node PBX. The address information on the radio terminal operation data 36 and the current information memory 37 is registered as physical accommodation position information 32 in the network database module NDM of each node together with the home node number in place of the communication line switch accommodation position 34 in FIG. 5.

With this information arrangement, upon reception of, for example, a position registration event originated from the radio terminal 103 with an individual PS number being added thereto, the radio base station 102 refers to the event transfer management memory (initial value) in FIG. 6 and transfers the event to the call control section 9 of the self-node (e.g., the node A). Upon identifying the transferred event as a position registration event, to specify the radio terminal 103 that has originated the position registration event, the call control section 9 obtains the logical accommodation position information 30 and the logical extension number 39, which are uniquely assigned to each radio terminal in the corresponding network, by referring to the network database module NDM 11 in accordance with the individual PS number. Furthermore, the call control section 9 causes the conversion section 31 in FIG. 8 to convert the logical accommodation position information 30 into the physical accommodation position information 32. The physical accommodation position information 32 includes the node number 33 indicating the home node PBX of the terminal, the radio terminal operation data 36 of the home node PBX as a virtual TSW accommodation position 34, and address information for specifying the current information memory 37.

If the node number 33 represented by the obtained physical accommodation position information 32 indicates the self-node, the call control section 9 notifies the memory management section (not shown) of the address 34 of the memory to be accessed which is indicated by the obtained physical accommodation position information 32, and designates position registration.

If the node number 33 represented by the obtained physical accommodation position information 32 indicates another node, the call control section 9 commands the communication control section 6 to transfer this position registration event to the node indicated by the physical accommodation position information. The communication control section 6 transfers the position registration event and the logical accommodation position information on the radio terminal to another node in accordance with this command.

In this manner, the call control section of any node can perform call control associated with the radio terminal 103 using the logical extension number without considering any home node PBX by using the individual PS number and the logical extension number as the logical accommodation position information 30, and the address information on the radio terminal operation data 36 and current information memory 37 as the communication line switch accommodation position 34 of the physical accommodation position information 32. In addition, upon reception of a termination connection command, the PM control section 5 recognizes from the logical extension number (logical accommodation position information) that the command is for termination control for the radio terminal 103. The PM control section 5 then acquires the area number of the registration position from the current information memory 37 of the home node through the communication control section 6, and can request the radio base station 102 of the node in the area where the corresponding radio terminal is present to perform termination connection.

In this manner, operation services similar to those for the radio terminal 103 accommodated in a single PBX can be provided regardless of the service area of the radio base station 102 in which the radio terminal 103 is present.

Operation in the radio terminal operation data write method in the private mobile communication system according to the present invention will be described next with reference to FIGS. 1, 2, and 7.

Assume that a third node exchange PBX-3 in FIG. 1 is the home node of the radio terminal 103, the radio terminal 103 is currently present in the radio wave zone of a radio base station 102-2 connected to a second node exchange PBX-2, and the position of the radio terminal 103 is registered. A case wherein terminal operation data on the radio terminal 103 is written in this state will be described below.

Figure 7:
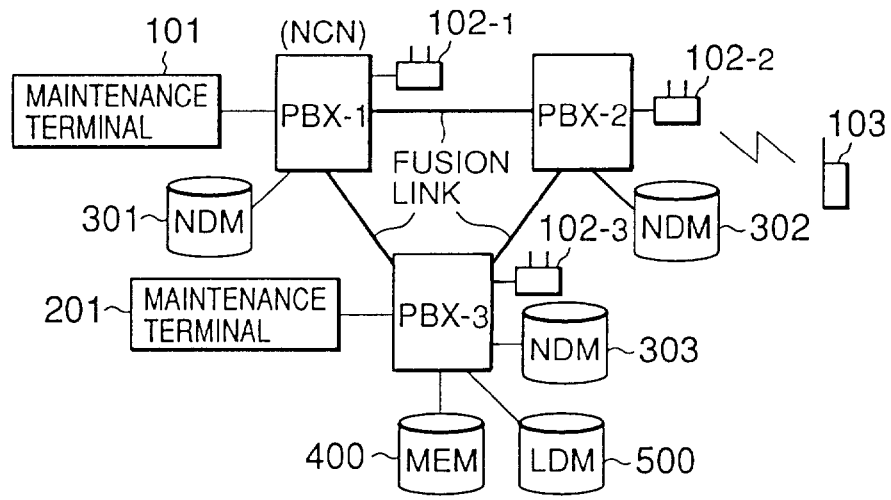
FIG. 7 is a block diagram showing the network arrangement of a private mobile communication system in which the data write method of the present invention is implemented and the layout of databases in each node exchange.

FIG. 7 further shows an example of how databases prepared for the respective node exchanges in FIG. 1 are arranged.

Referring to FIG. 7, a node exchange PBX-1 is referred to as an operation data write start node (NCN) and connected to a maintenance terminal 101 capable of rewriting data on all the radio terminals belonging to the network. As described above, the radio terminal 103 as the data write target is currently present in the service area of the node exchange PBX-2. The node exchange PBX-3 is the home node exchange of the radio terminal 103 as the write target. The respective node exchanges have network database modules NDMs 301 to 303 in which identical data are stored. The contents of each NDM can be written at only the maintenance terminal 101 connected to the NCN (node exchange PBX-1). When the contents of the NDM 301 are written at the NCN, the resultant data are simultaneously transmitted to the remaining NDMs 302 and 303, thereby always holding the same contents. Although shown for only the node exchange PBX-3 in FIG. 7, each node exchange includes a local database module LDM 500 storing information unique to each node exchange and a current information memory MEM 400 as a memory to be used for call processing for position registration information on the radio terminal 103, available/busy information, and the like. In addition, each node exchange includes a maintenance terminal 201 for writing/registering (initial registration) operation management data on the radio terminal 103 managed by each node exchange.

The maintenance terminal 101 connected to the first node exchange PBX-1 designates the logical extension number of the radio terminal 103 and requests the first node exchange PBX-1 to write terminal operation data (sequence ①).

The first node exchange PBX-1 obtains a logical accommodation position from the logical extension number, and obtains the physical accommodation position information 32 by referring to the network database module NDM 301 of the self-node, thereby identifying the node number 33 of the third node exchange PBX-3 as the home node of the write target radio terminal, which is contained in the physical accommodation position information 32.

The first node exchange PBX-1 requests the identified home node (node exchange PBX-3) through the fusion link to acquire the position registration information (current location area number) of the radio terminal 103 and available/busy information. The information to be transferred at this time includes logical accommodation position information and a current information memory read request signal. In response to this request, the node exchange PBX-3 identifies the self-node exchange as the home node of the target radio terminal 103 as a result of conversion from the logical accommodation position information into physical accommodation position information, and reads out the information associated with the radio terminal 103 from the MEM 400 in accordance with the address information contained in the physical accommodation position information. The readout information is returned from the node exchange PBX-3 to the node exchange PBX-1 (sequences ②-1 and ②-2).

If the returned information indicates that the radio terminal 103 is in a busy state or its position is not registered within the network area, the node exchange PBX-1 notifies the maintenance terminal 101 of a write failure, and ends the write processing.

If write operation is possible, the node exchange PBX-1 outputs a request for termination processing for terminal operation data write to the second node exchange PBX-2 indicated by the current location area number upon adding the logical accommodation position information on the radio terminal 103 to the request (sequence ③).

The second node exchange PBX-2 refers to the network database module NDM in accordance with the notified logical accommodation position information to obtain the node number 33 of the third node exchange PBX-3 as the home node, and requests the node exchange PBX-3 through the fusion link to transfer the currently registered attribute information as in the above case.

As in the above case as well, the node exchange PBX-3 searches the local database module LDM 500 in accordance with the physical accommodation position information to read out necessary data on the radio terminal 103, e.g., the SYS-ID, the individual PS number, and the PS-ID, and return them to the node exchange PBX-2 (sequences ④-1 and ④-2).

The node exchange PBX-2 controls the radio base station 102 to connect to the radio terminal 103, and writes the terminal operation data (sequences ⑤-1 and ⑤-2).

When the write communication processing is properly complete, the second node exchange PBX-2 notifies the first node exchange PBX-1 of the completion of the write (sequence ⑥). The first node exchange PBX-1 notifies the maintenance terminal 101 of the normal termination of the write (sequence ⑦), and ends the processing.

If normal communication with the radio terminal 103 fails, the node exchange PBX-1 notifies the maintenance terminal 101 of the write failure following similar sequences, and ends the processing.

What is claimed is:

1. A radio terminal operation data write method in a private mobile communication system including a multi-node PBX having a plurality of node exchanges connected to each other through a high-speed data line, comprising:

the step of causing a maintenance terminal connected to a first node exchange of said plurality of node exchanges to designate a logical extension number unique in said multi-node PBX and added to a radio terminal with respect to said first node exchange and request said radio terminal to write terminal operation data by radio;

the step of causing said first node exchange to refer to a self-network database module holding data common in said multi-node PBX in accordance with the logical extension number so as to specify a third node exchange of said plurality of node exchanges in which the radio terminal operation data is registered;

the current location area node specifying step of causing said first node exchange to refer to a current information memory of said radio terminal of said third node exchange directly when said third node exchange coincides with said first node exchange or through the high-speed data line when said third node exchange differs from said first node exchange, thereby specifying a second node exchange of said plurality of node exchanges which corresponds to an area where said radio terminal is currently present;

the step of causing said first node exchange to output, to said second node exchange, a request to write operation data in said radio terminal by radio with the logical extension number being added to the request when said second node exchange differs from said first node exchange;

the step of causing said second node exchange to specify said third node exchange by referring to said self-network database module in accordance with the logical extension number;

the step of reading out data to be written in said radio terminal from operation data on said radio terminal held by said third node exchange directly when said second node exchange coincides with said third node exchange or through the high-speed data line when said second node exchange differs from said third node exchange;

the data write step of connecting said second node exchange to said radio terminal by radio and writing the data to be written in said radio terminal;

the step of causing said second node exchange to notify said first node exchange of a normal/abnormal end of the write processing when said second node exchange differs from said first node exchange; and the step of causing said first node exchange to notify said maintenance terminal of the normal/abnormal end.

2. A method according to claim 1, wherein the data write step comprises causing said second node exchange to notify said first node exchange of a write failure when said second node exchange cannot be connected to said radio terminal by radio, and causing said first node exchange to notify said maintenance terminal of the write failure and terminate processing.

3. A method according to claim 1, wherein the current location area node specifying step comprises causing said first node exchange to notify said maintenance terminal of a write failure and terminate processing when said current information memory indicates that said radio terminal is in a busy state.

4. A method according to claim 1, wherein said first node exchange is a node exchange having a right to update said network database module.

5. A radio terminal operation data write method in a private mobile communication system including a multi-node PBX having a plurality of node exchanges connected to each other through a high-speed data line, comprising the steps of:

causing a node exchange to which a maintenance terminal is connected to specify a registration node exchange of a radio terminal from a logical extension number which is unique within said multi-node PBX and added to said radio terminal, acquire information on a current location area node exchange of said radio terminal through the high-speed data line, and request said current location area node exchange to write terminal operation data on said radio terminal; and causing said current location area node exchange to acquire termination operation data on said radio terminal from said registration node exchange through the high-speed data line in accordance with the logical extension number and write the terminal operation data.

6. A method according to claim 5, wherein each of said plurality of node exchanges comprises a network database module for holding data common in said multi-node PBX, the terminal operation data on said radio terminal having the logical extension number is held in said network database module, and data specifying said registration node exchange for managing current location area information on said radio terminal is written in said network database module.

7. A method according to claim 6, wherein said node exchange to which said maintenance terminal is connected is a node exchange having a right to update said network database module.

* * * * *